US 8,378,653 B2

(12) United States Patent
Mair

(10) Patent No.: US 8,378,653 B2
(45) Date of Patent: Feb. 19, 2013

(54) HDMI DRIVER TAIL CURRENT TRANSISTORS WITH CURRENT MIRROR CONTROLLED LEADS

(75) Inventor: Hugh Thomas Mair, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 841 days.

(21) Appl. No.: 12/542,685

(22) Filed: Aug. 17, 2009

(65) Prior Publication Data

US 2011/0037447 A1 Feb. 17, 2011

(51) Int. Cl.
*G05F 1/46* (2006.01)
(52) U.S. Cl. ............................. 323/282; 455/91
(58) Field of Classification Search .................. 323/222, 323/282–284, 220, 234, 901, 905; 710/5, 710/7; 327/538, 540, 541; 455/91–129; 326/82, 83, 86, 115
See application file for complete search history.

(56) References Cited

U.S. PATENT DOCUMENTS 8,183,711 B2 * 5/2012 Asmanis et al. ............... 307/31
2008/0278122 A1 * 11/2008 Chi ............................. 323/220

* cited by examiner

*Primary Examiner* — Bao Q Vu
*Assistant Examiner* — Yemane Mehari
(74) *Attorney, Agent, or Firm* — Lawrence J. Bassuk; W. James Brady; Frederick J. Telecky, Jr.

(57) ABSTRACT

A HDMI (High-Definition Multimedia Interface) transmitter component may be operated solely on power that is scavenged and converted from termination tail current received while the HDMI transmitter component is coupled to an HDMI compliant sink connector on a HDMI receiver component. The termination tail current is received at the transmitter component from a plurality of differential HDMI signals from terminators on a receiver component. A portion of the received tail current is converted to form a supply voltage Vdd source. Function logic on the transmitter component is operated using the Vdd voltage, and the function logic is configured to control the plurality of differential signals.

10 Claims, 5 Drawing Sheets

US 8,378,653 B2

HDMI DRIVER TAIL CURRENT TRANSISTORS WITH CURRENT MIRROR CONTROLLED LEADS

FIELD OF THE INVENTION

This invention generally relates to the field of providing power for a computer peripheral and more particularly to scavenging power from an HDMI interface.

BACKGROUND OF THE INVENTION

HDMI (High-Definition Multimedia Interface) is a compact audio/video interface for transmitting uncompressed digital data. It represents a digital alternative to consumer analog standards, such as Radio Frequency (RF) coaxial cable, composite video, S-Video, SCART, component video, D-Terminal, and VGA. HDMI connects digital audio/video sources—such as set-top boxes, Blu-ray Disc players, personal computers (PCs), video game consoles (such as the PlayStation 3 and Xbox 360), and AV receivers—to compatible digital audio devices, computer monitors, and digital televisions.

HDMI supports, on a single cable, any TV or PC video format, including standard, enhanced, and high-definition video; up to 8 channels of digital audio; and a Consumer Electronics Control (CEC) connection. The CEC allows HDMI devices to control each other when necessary and allows the user to operate multiple devices with one remote control handset. Because HDMI is electrically compatible with the signals used by Digital Visual Interface (DVI), no signal conversion is necessary, nor is there a loss of video quality when a DVI-to-HDMI adapter is used. As an uncompressed connection, HDMI is independent of the various digital television standards used by individual devices, such as ATSC and DVB, as these are encapsulations of compressed MPEG video streams which can be decoded and output as an uncompressed video stream on HDMI.

HDMI products started shipping in the autumn of 2003. A large number of Consumer Electronics (CE) and PC companies have adopted the HDMI specification (HDMI Adopters). In Europe, either DVI-HDCP or HDMI is included in the HD ready in-store labeling specification for TV sets for HDTV, formulated by EICTA with SES Astra in 2005. HDMI began to appear on consumer HDTV camcorders and digital still cameras in 2006.

The Display Data Channel (DDC) is a communication channel based on the I²C bus specification. HDMI specifically requires support for the Enhanced Display Data Channel (E-DDC), which is used by the HDMI source device to read the E-EDID data from the HDMI sink device to learn what audio/video formats it supports. HDMI requires that the E-DDC support I²C standard mode speed (100 kbit's) and allows optional support for fast mode speed (400 kbit/s). HDMI has three separate communication channels, which are the DDC, TMDS, and the optional CEC.

Transition Minimized Differential Signaling (TMDS) on HDMI carries video, audio, and auxiliary data via one of three modes, called the Video Data Period, the Data Island Period, and the Control Period. During the Video Data Period, the pixels of an active video line are transmitted. During the Data Island period (which occurs during the horizontal and vertical blanking intervals), audio and auxiliary data are transmitted within a series of packets. The Control Period occurs between Video and Data Island periods.

Both HDMI and DVI use TMDS to send 10-bit characters that are encoded using 8b/10b encoding for the Video Data Period and 2b/10b encoding for the Control Period. HDMI adds the ability to send audio/auxiliary data using 4b/10b encoding for the Data Island Period. Each Data Island Period is 32 pixels in size and contains a 32-bit Packet Header, which includes 8 bits of BCH ECC parity data for error correction and describes the contents of the packet.

A number of transmitter components are now available that are designed to connect to a receiver component, such as a TV or monitor using the HDMI port that is now commonly provided on TVs and monitors. A game console is one example of a stand alone, battery powered transmitter component that may be connected to a TV or monitor and provide interaction with a game that is displayed on the TV or monitor. Unlike the universal serial bus (USB) that allows for connection of various components to a computer and which provides a power signal that can be used to power a small device, the HMDI does not provide a power signal for use by a transmitter component connected to the HMDI port. The only power signal included in the HMDI port is a 5 volts signal that is intended to allow the transmitter component to provide power to an identification ROM (read only memory) on the receiver component to allow the transmitter component to determine the capabilities of the receiver by reading the ID ROM.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

HDMI (High-Definition Multimedia Interface) is a compact audio/video interface for transmitting uncompressed digital data from an HDMI transmitter component to an HDMI receiver component coupled via a cable or directly connected. HDMI supports, on a single cable, any TV or PC video format, including standard, enhanced, and high-definition video; up to 8 channels of digital audio; and a Consumer Electronics Control (CEC) connection. While HMDI does not provide a power signal for use by a transmitter component connected to the HMDI port, a small amount of power may be recovered from the current provided by termination resistors connected to the clock and signal lines of the receiver component's HMDI port. This is done by inserting a power recovery circuit into the tail current path of the TMDS (Transition Minimized Differential Signaling) drivers and using a switching circuit to convert the power to a usable voltage for logic circuit operations. At least 50 mW of power can be recovered in this manner. The technique will be described in more detail below. This recovered power may be used to power a transmitter component that is the source of image data for the receiver component. This may allow operation of the transmitter component without the use of batteries, or for devices with batteries it may allow operation without depleting the batteries of the device.

Figure 1:
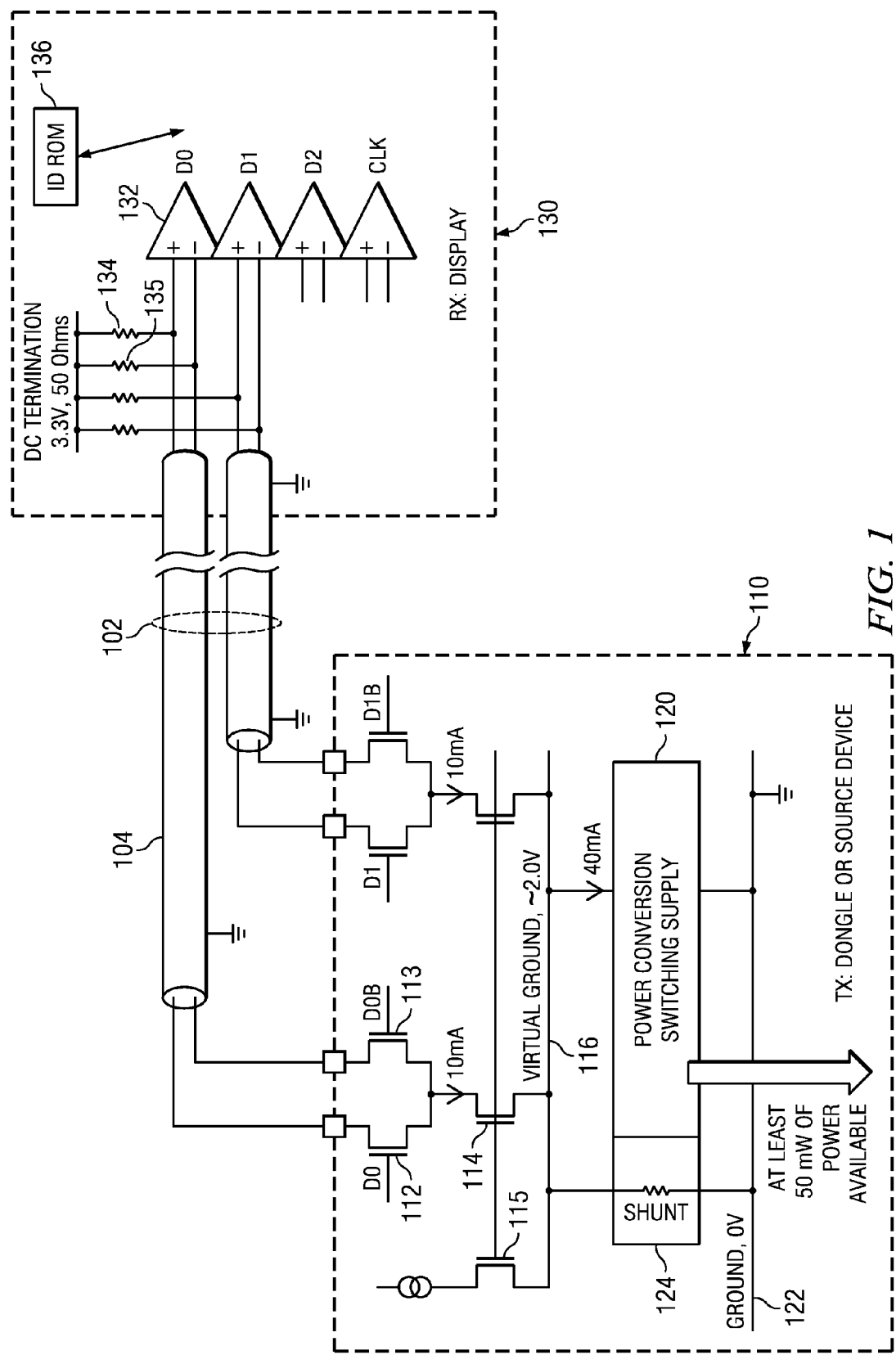
FIG. 1 is an illustrative block diagram of a system with a receiver component coupled to a transmitter component via an HDMI cable.

FIG. 1 is an illustrative block diagram of a system with a receiver component 130 coupled to a transmitter component 110 via an HDMI cable 102. HDMI system architecture is defined to consist of Sources and Sinks. A source, also referred to herein as a transmitter component, may also be referred to as transmitter device or other equivalent nomenclature. A sink, also referred to herein as a receiver component, may also be referred to as a receiver device or other equivalent nomenclature. Sinks are typically a component that displays video or graphical images, such as a television, a computer monitor, a digital picture frame, etc. Sources are typically components that provide the video or graphical images, such a cable or satellite conversion box, a DVD player, a camera, a game console, etc. Embodiments of the present invention may include battery-less game consoles, dongles for receiving a wireless broadcast of a video or graphical stream, etc. Embodiments of the present invention may also include battery powered devices such as cellular telephones, video or digital cameras, etc.

HDMI cable 102 and connectors carries four differential pairs (only two are illustrated) that make up the TMDS data and clock channels. Differential pair 104 is representative of the four differential pairs. These channels are used to carry video, audio and auxiliary data. In addition, HDMI carries a VESA (Video Electronics Standards Association) DDC (Display Data Channel) channel. The DDC is used for configuration and status exchange between a single Source and a single Sink. The optional CEC protocol provides high-level control functions between all of the various audiovisual products in a user's environment.

Audio, video and auxiliary data is transmitted across the three TMDS data channels. A TMDS clock, typically running at the video pixel rate, is transmitted on the TMDS clock channel and is used by the receiver as a frequency reference for data recovery on the three TMDS data channels. At the source 104, TMDS encoding converts the 8 bits per TMDS data channel into the 10 bit DC-balanced, transition minimized sequence which is then transmitted serially across each pair 104 at a rate of 10 bits per TMDS clock period. The DDC is used by the Source to read the Sink's Enhanced Extended Display Identification Data (E-EDID) ID ROM 136 in order to discover the Sink's configuration and/or capabilities.

A device's external HDMI connection is presented via one of the three specified HDMI connectors, Type A, Type B or Type C. This connector can be attached directly to the device or can be attached via a cable adapter that is shipped with the device. All three connectors carry all required HDMI signals, including a TMDS link. The Type B connector is slightly larger and carries a second TMDS link, which is necessary to support very high resolution displays using dual link. The Type C connector carries the same signals as the Type A, but is more compact and intended for mobile applications. Table 1 lists the pin assignment for a Type C connector.

TABLE 1

Type C Connector Pin Assignment

| PIN | Signal Assignment |
|---|---|
| 1 | TMDS Data2 Shield |
| 2 | TMDS Data2+ |
| 3 | TMDS Data2− |
| 4 | TMDS Data1 Shield |
| 5 | TMDS Data1+ |
| 6 | TMDS Data1− |
| 7 | TMDS Data0 Shield |
| 8 | TMDS Data0+ |
| 9 | TMDS Data0− |
| 10 | TMDS Clock Shield |
| 11 | TMDS Clock+ |
| 12 | TMDS Clock− |
| 13 | DDC/CEC Ground |
| 14 | CEC |
| 15 | SCL |
| 16 | SDA |
| 17 | Reserved |
| 18 | +5 V Power |
| 19 | Hot Plug Detect |

Referring again to FIG. 1, sink device 130 includes four differential receivers for the three TMDS data signal lines D0, D1, and D2 and the clock signal line CLK. Receiver 132 is representative of the four receivers and is connected to termination resistors 134 and 135. Termination resistors 134, 135 are 50 ohm resistors and match the impedance of cable 102 to damp out signal reflections while high speed data is being transmitted on signal pair 104. The termination resistors are connected to a link reference voltage AVcc that is typically a 3.3 volt source. Each of the three TMDS signals and clock signal are terminated in a similar manner. TMDS technology uses current drive to develop a low voltage differential signal at the Sink side of the DC-coupled transmission line. The link reference voltage AVcc sets the high voltage level of the differential signal, while the low voltage level is determined by the current source of the HDMI Source and the termination resistance at the Sink. The termination resistance (RT) and the characteristic impedance of the cable (Z0) must be matched.

Source device 110 includes a differential driver for each of the three TMDS signals and the clock signal. Transistor pair 112,113 coupled to differential signal line 104 is representative of the four differential drivers in source device 110. Transistor pair 112, 113 is connected to tail current transistor 114 that sets a quiescent idle current through each of the pair of transistors and thereby signal pair D0 104. The idle current is provided by termination resistors 134, 135 for signal pair D0, and similarly on the three other signal pairs. The gate of a current source transistor 115 is connected to the gate of tail current transistor 114 and similarly to each of the tail current transistors for the other three differential drivers in a current mirror configuration and thereby biases each tail current transistor to allow a selected amount of idle current to flow in its associated differential pair. An idle current of 10 ma per pair is illustrated in this embodiment.

Power conversion circuit 120 is connected to node 116 that collects all four tail currents, in this case 40 ma. Shunt device 124 is also connected to node 116 and to ground node 112. Shunt device 124 in combination with power conversion circuit 120 establish a virtual ground potential on node 116 that is approximately two volts above the potential on ground node 112. As will be described in more detail below, the virtual ground potential may be set at a different value, but typically in the range of one to two volts. Power conversion circuit 120 is a switching circuit that operates on the two volt potential established between virtual ground node 116 and ground node 122 and switches the combined tail current in order to recover the tail current energy to produce a voltage source that can be used to power logic circuits on source device 110. In this manner, at least 50 of power may be recovered for use in a typical scenario.

Figure 2:
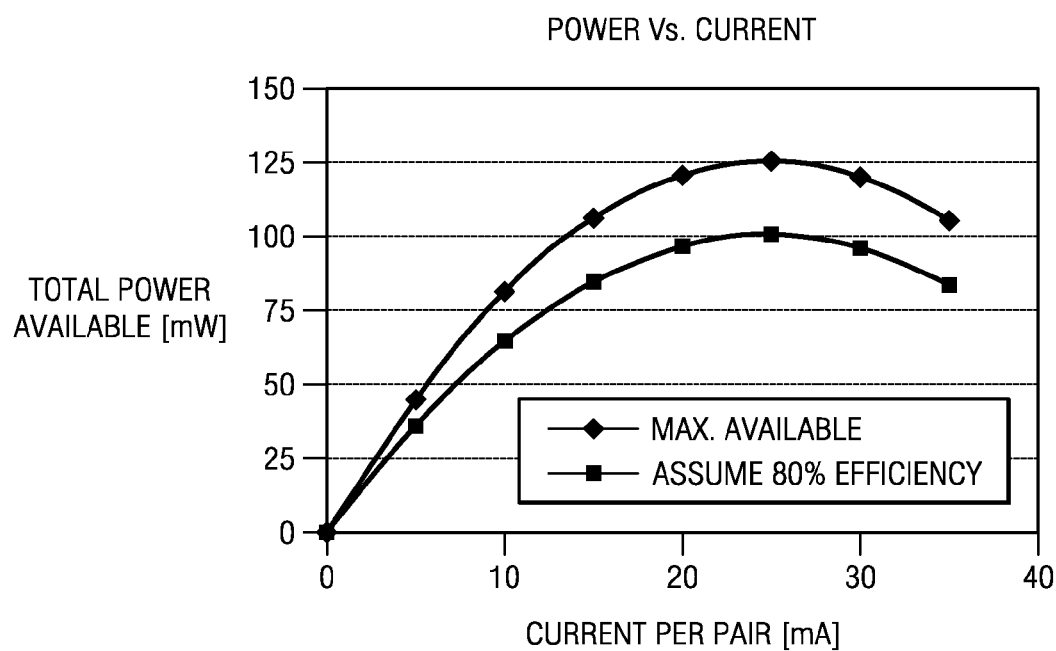
FIG. 2 is a plot of power that may be extracted from the four pair of differential signal lines in the HDMI cable of FIG. 1.

FIG. 2 is a plot of power that may be extracted from the four pair of differential signal lines in the HDMI cable of FIG. 1. As a video signal is applied to each pair of differential signal lines by the differential driver, the resultant varying signal voltage will cause the current in one line to vary in a similar manner from the quiescent level and the current in the other line vary in an opposite manner. In this manner, the total current through the pair remains essentially constant during signal transmissions because a current increase in one line is offset by a decrease in the other line and vise versa.

The value of the quiescent idle current may be adjusted over a range of values. Keep in mind that the termination voltage on the receiver is 3.3 volts which limits the upper end of the current range. Thus, the maximum current per line is 3.3 v/50=66 ma. However, cable resistance will reduce this value. In order to recover energy from the tail current, the virtual ground level must be set at a value in the range of approximately 1.0-2.5 volts which reduces the maximum current per line accordingly. For example, if the virtual ground is set at 2.0 volts, then there is an effective maximum current per line of (3.3-2.0)/50=26 ma. If the idle current is set too near the lower or upper end of the current range, then there is little or no dynamic range for transmitting a signal. Typically, the idle current is set at approximately 5 ma per line for a total of 10 ma per pair.

The maximum power that can be recovered equals the combined tail current times the virtual ground voltage. For example, if the virtual ground node 116 is set at 2.0 volts and 10 ma is provided by each of the four pair, then maximum recoverable energy is 2.0 v×10 ma×4=80 mw. If the power conversion circuit is 80% efficient, then an actual energy of 64 mw may be recovered, as indicated in FIG. 2. The amount of recoverable energy varies based on the amount of tail current from each pair, as illustrated in FIG. 2, up to a theoretical maximum of approximately 100 mw.

When a source component is first activated, it may need to check the ID ROM on the receiver component to determine the capabilities of the receiver, as defined in the HDMI standard. The HDMI connector provides a pin allowing the Source to supply +5.0 Volts to the cable and Sink. Typically, the ID ROM in the receiver is not connected to other logic in the receiver so that it can be read by the source component even when the sink component is turned off. The HDMI standard specifies all HDMI sources shall be able to supply a minimum of 55 mA to the +5V Power pin. A sink should not draw more than 50 mA of current from the +5V Power pin, and when the sink is powered on it should draw no more than 10 mA of current from the +5V Power signal. The return for the +5V Power signal is DDC/CEC Ground signal.

Figure 3:
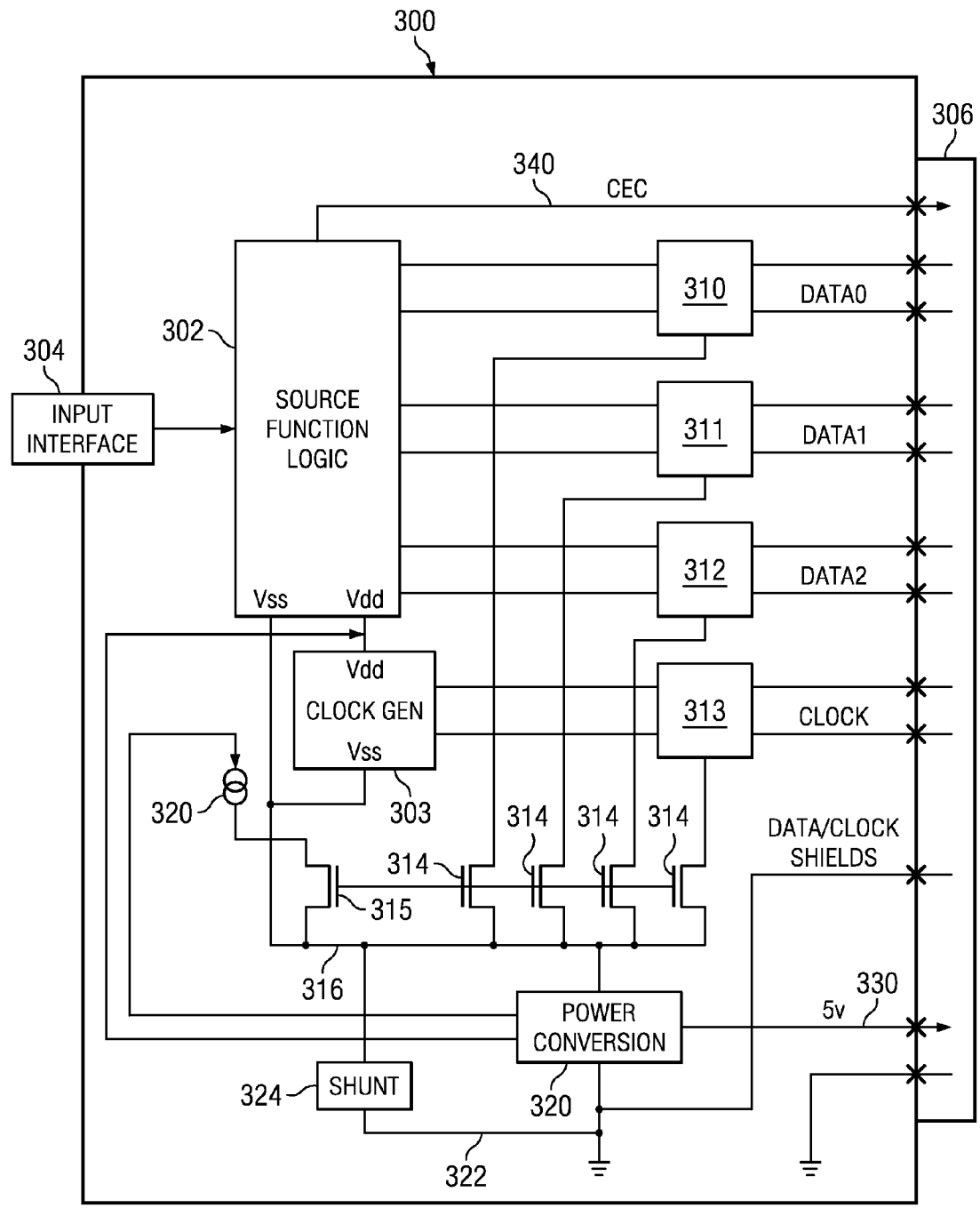
FIG. 3 is a more detailed block diagram of an HDMI transmitter component.

FIG. 3 is a more detailed block diagram of an HDMI transmitter component 300. Transmitter component 300 includes source function logic 302 that performs the functional operations of the component. For example, if transmitter component 300 is a game console, source function logic 302 may include memory for storing the game instruction code, a processor for executing the game instruction code, possibly a graphic accelerator portion for generating game graphics, and interface logic to receive input from input interface 304. The input interface for a game console will have at least one manual input device such as keys, buttons, a joy stick, track ball, etc to allow a game user to interact with the game. Source function logic 302 is connected to TDMS drivers 310-312 that are in turn connected to designated pins on HDMI connector 306. HDMI connector 306 follows the pin assignments of the HDMI standard, such as those listed in Table 1 for a type C connector. Connector 306 may be connected to an HDMI cable and thereby to a receiver component, or it may be connected directly to an HDMI sink connector on the receiver component. Clock generation logic 303 generates the clock signal that is connected to TDMS clock driver 313 and also provides a clock signal for use by logic 302.

As described with reference to FIG. 1, current source transistor 315 is connected in a current mirror fashion with tail current transistors 114 for each of differential drivers 310-313. Current source 320 sets the current value that is mirrored by tail current transistors 114. Current source 320 may be a simple resistor or may be designed to be adjusted under control of logic 302, for example, to allow changing tail current settings, as discussed above.

Power conversion logic 320 and shunt 324 are connected between virtual ground node 316 and ground node 322 and establish a virtual ground reference level Vss. Shunt 324 may be a simple resistor for some embodiments. In other embodiments it may be a diode or a string of diodes, a zener diode or another type of regulator device with a somewhat fixed voltage drop, for example. Power conversion logic 320 is a simple switching regulator where switching frequency and the duty cycle are generally fixed. This determines the amount of charge that is transferred and hence the dropout on the input side which sets the tail current for the diff pairs. This means that the load current needs to be approximately constant so this requires a voltage clamp in the form of shunt 324. Power conversion logic 320 extracts energy from the combined tail current using the voltage potential established by virtual ground node 316 and actual ground node 322, as described above, and forms a supply voltage Vdd that is provided for the operation of source function logic 302, clock generator 303 input interface logic 304, current source 320 and any other logic within transmitter component 300, referenced to the virtual ground Vss node 316. In this manner, transmitter component 300 does not need any other source of power, such as a battery. Of course, source function logic 302 and the other circuits on transmitter component must be designed to operate within the power constraints of power conversion logic 320, which may be at least 50 mw, for example.

As described above, power conversion logic 320 may be configurable in some embodiments to allow a higher power to be generated for short periods of time by adjusting the tail current values.

Figure 4:
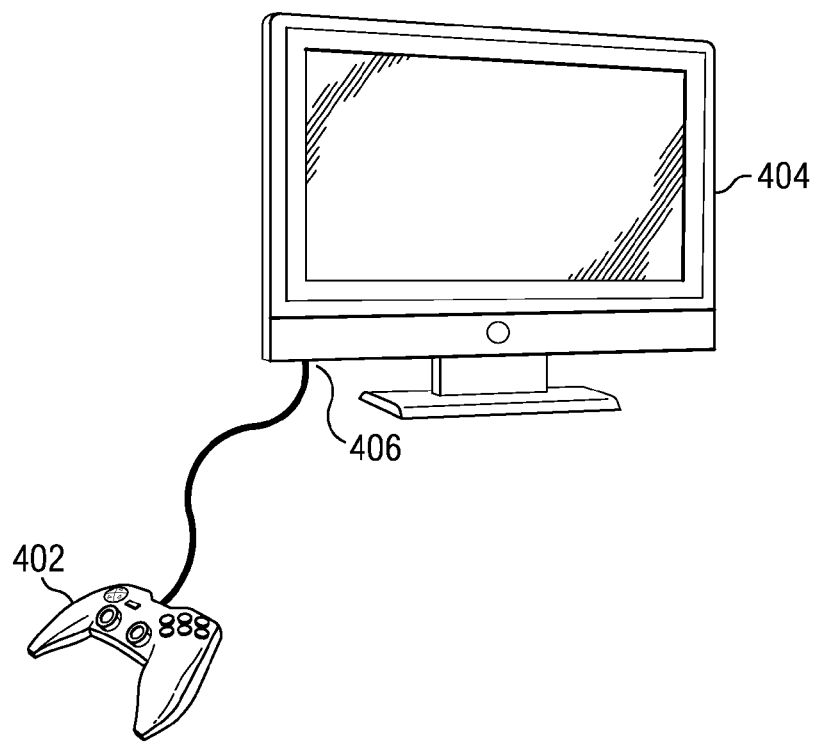
FIG. 4 is an illustrative battery-free HDMI transmitter component coupled to a monitor via an HDMI cable, from which the transmitter component scavenges enough power for operation.

FIG. 4 is an illustrative battery-free transmitter component 402 coupled to a monitor 404 via an HDMI cable coupled to HDMI sink connector 406 on monitor 404. As described above with respect to FIGS. 1-3, battery-free transmitter component 402 scavenges enough power for operation from HDMI sink port 406 of monitor 404. In this embodiment, battery-free transmitter component 402 is a game console and includes a user interface with several manual input indicators for a game type application. Function logic in transmitter component 402 includes memory for storing the game instruction code and a processor to execute the game instruction code. The function logic includes a frame buffer to store the graphic images for the game and encoding logic to produce the HDMI video data. The data transmitted to receiving component 404 is for producing a graphical image for the game on the receiving component.

Figure 5:
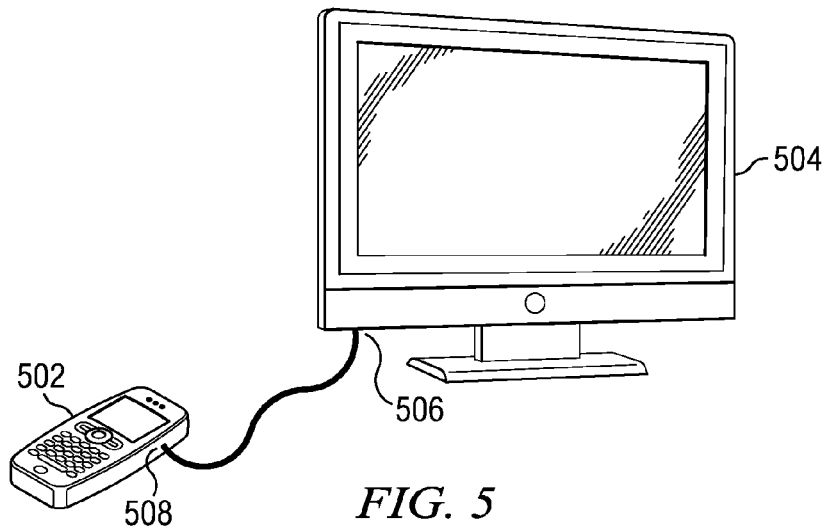
FIG. 5 is an illustrative HDMI transmitter component with a battery coupled to a monitor via an HDMI cable, from which the transmitter component scavenges enough power for operation without draining the battery of the transmitter component.

FIG. 5 is an illustrative transmitter component 502 with battery coupled to a monitor 504 via an HDMI cable connected to HDMI sink connector 506 on monitor 504 from which the transmitter component scavenges enough power for operation without draining the battery of the transmitter component. In this embodiment, transmitter component 502 is a mobile handset for use in the cellular telephone network. Mobile handset 502 includes interface logic that receives image data from the mobile handset and source function logic that is configured to transmit the image data to the display screen over the plurality of TDMS data and clock signal lines of HDMI connector 508. Power conversion logic is configured to extract power from the HDMI port of monitor 504 as described in more detail with respect to FIGS. 1-3 and to provide power to a portion of the mobile handset while the transmitter component of the mobile handset is connected to the display screen. In this manner, the mobile handset may provide video or graphic data to be displayed on monitor 504 for long periods of time without draining the battery within mobile device 502. The video or graphic data may be in the form of pictures or video that was previously captured by a camera function of the mobile handset. The video or graphic data may also be in the form of live data being received from the cellular network, for example.

Figure 6:
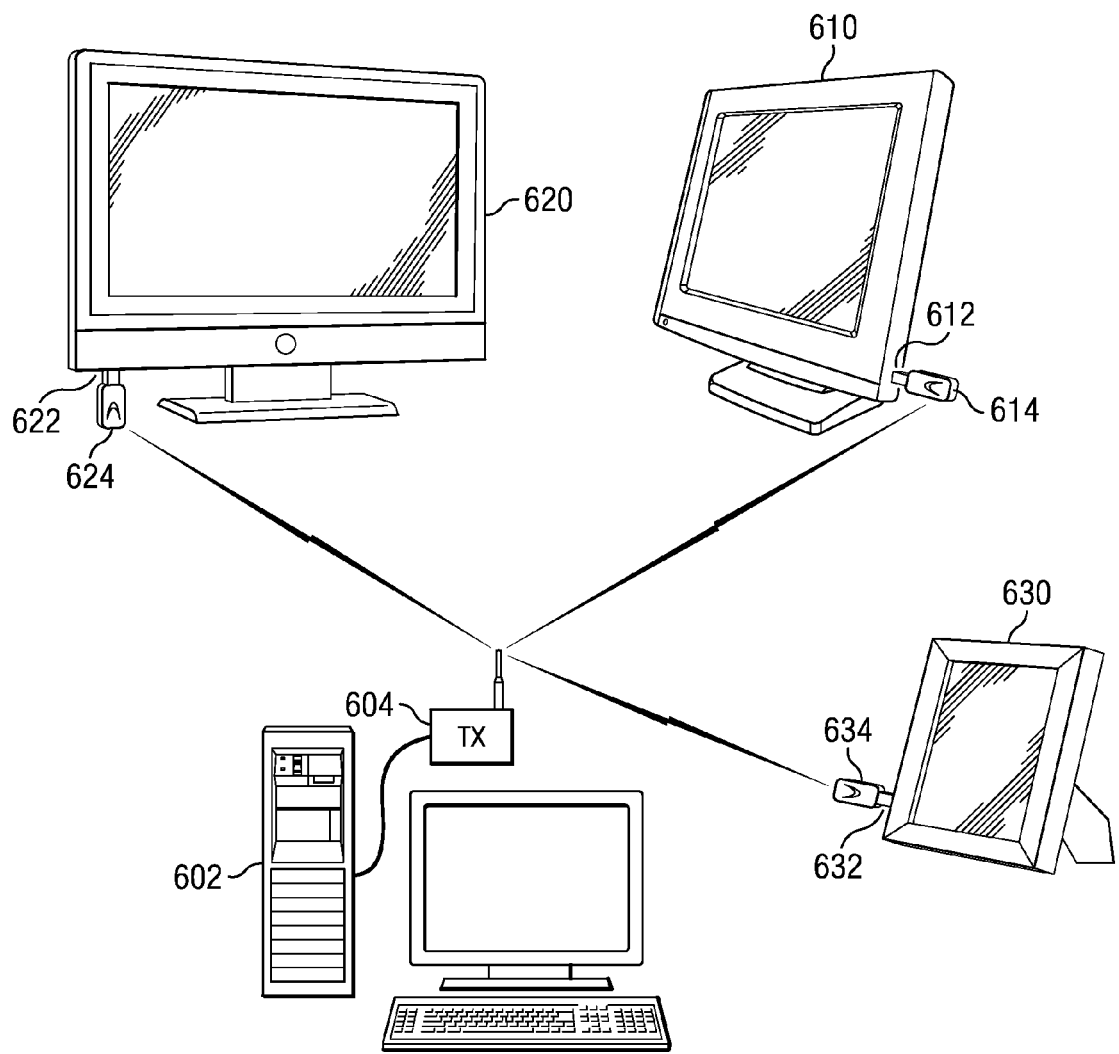
FIG. 6 is an illustrative system that pushes various video and graphical images to display devices using a battery-free transmitter component coupled to each display device via an HDMI port.

FIG. 6 is an illustrative system 602 that pushes various video and graphical images to display devices using a battery-free transmitter component coupled to each display device via an HDMI port. System 602 may be any of several types of computer based system that can store graphic and/or video data. System 602 may be connected to a network by either a hardwired connection or a wireless connection and receive graphic and/or video data via the network using well known techniques. System 602 may be a desktop computer, a portable computer, a personal data assistant, a server system, a remote storage system, or any of a number of types of graphics/video processing or storage systems for home or commercial use. System 602 includes or is coupled to a wireless transmitter 604 that is configured to transmit video or graphics data that is stored within system 602 or received from a network by system 602 in real time.

Television 620 includes an HDMI connector 622 that conforms to the HDMI standard. Dongle 624 is a transmitter component configured to connect directly to an HDMI port on a display screen, such as HDMI connector 622. Dongle 624 includes interface logic in the form of an antenna and radio frequency (RF) receiver configured to receive a video stream transmitted from a host system, such as system 602. In a typically embodiment, the interface logic only performs radio frequency reception. Dongle 624 includes function logic coupled to the interface logic that is configured to transmit the received video stream to the display screen over the plurality of TDMS data and clock signal lines in the HDMI connector. The function logic is configured to perform MPEG decoding of the received video stream. Some embodiments may provide 1080P capability, while some embodiments may perform lower levels of decoding to conserve power usage. The function logic includes a frame buffer to store the decoded frames and encoding logic to produce the HDMI video data. Power conversion logic in dongle 624 is configured to extract power from the HDMI port of TV 620 as described in more detail with respect to FIGS. 1-3 and to provide power to function logic and interface logic within dongle 624 while the dongle is connected to the TV. In this manner, battery-free dongle 624 may provide video or graphic data to be displayed on TV 622 received from system 602.

Monitor 610 includes an HDMI connector 612 that conforms to the HDMI standard. Dongle 614 is a transmitter component configured to connect directly to an HDMI port on a display screen, such as HDMI connector 612. Dongle 614 includes interface logic in the form of an antenna and RF receiver configured to receive a video stream transmitted from a host system, such as system 602. Dongle 614 includes function logic coupled to the interface logic that is configured to transmit the received video stream to the display screen over the plurality of TDMS data and clock signal lines in the HDMI connector. The video stream may be from a graphics card installed in system 602 that is configured to produce a computer monitor image for system 602 on remoter monitor 610. In this embodiment, the remote monitor may be used for display only, or a wireless user interface such as a keyboard and mouse may be coupled to system 602 using known techniques to provide a complete remote KVM (keyboard, video, mouse) installation coupled to system 602. The function logic is configured to perform decoding of the received video stream which may be one of several standard formats or may be a proprietary format offered by a particular graphics card vendor in which the graphics card is installed in system 602. The function logic includes a frame buffer to store the decoded frames and various embodiments of dongle 614 may provide varying levels of image resolution. The function logic includes encoding logic to produce the HDMI video data. Power conversion logic in dongle 614 is configured to extract power from the HDMI port of monitor 612 as described in more detail with respect to FIGS. 1-3 and to provide power to function logic and interface logic within dongle 614 while the dongle is connected to the monitor. In this manner, battery-free dongle 614 may provide video or graphic data to be displayed on monitor 612 received from system 602.

Picture frame 630 is a digital picture frame that includes an HDMI compliant connector 632. The digital picture frame may be any one of various devices designed to display picture data with relatively low update rates. Some devices may be designed to display video streams or snippets; some may include a sound reproduction system. Picture frame 630 may be battery powered, or may be connected to a source of power such as a solar cell or a wall outlet. Dongle 634 includes interface logic in the form of an antenna and receiver configured to receive a picture stream transmitted from a host system, such as system 602, or directly from a digital camera that is equipped with or coupled to an RF transmitter. Dongle 624 includes function logic coupled to the interface logic that is configured to transmit the received picture stream to the display screen over the plurality of TDMS data and clock signal lines in the HDMI connector. The picture stream may be from a graphics card installed in system 602 that is configured to produce a computer monitor image for system 602, for example, or may be in the form of image files conforming to one or more digital camera formats, for example. The function logic includes a frame buffer to store the picture frames and various embodiments of dongle 634 may provide varying levels of image resolution. The function logic includes encoding logic to produce the HDMI picture data. Power conversion logic in dongle 634 is configured to extract power from the HDMI port of picture frame 630 as described in more detail with respect to FIGS. 1-3 and to provide power to function logic and interface logic within dongle 634 while the dongle is connected to the picture frame. In this manner, battery-free dongle 634 may provide video or graphic data to be displayed on picture frame 630 received from system 602.

Various embodiments of dongles 614, 624 and 634 may perform only one or several of the functions described above. For example, a single dongle may be designed to include all of the functionality of dongles 614, 624 and 634.

Figure 7:
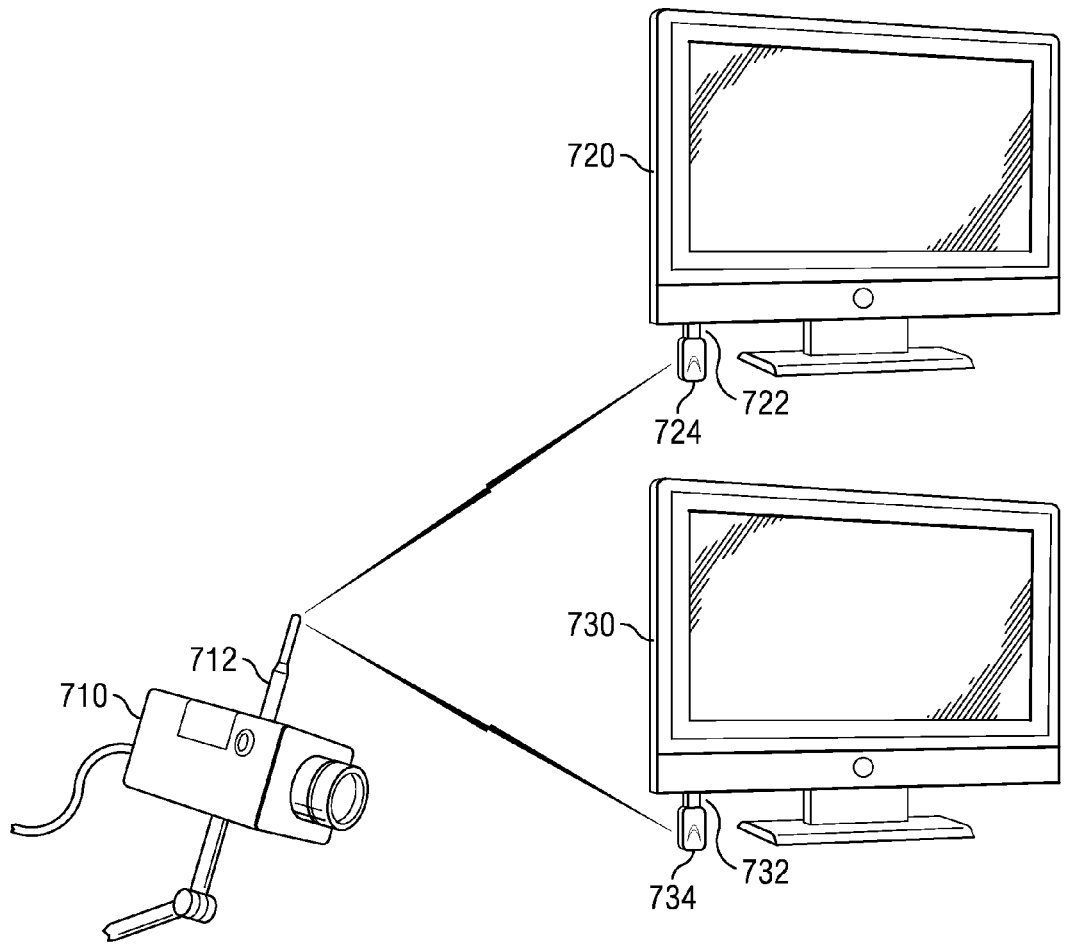
FIG. 7 is an illustrative camera that pushes video and/or still motion images to display devices using a battery-free transmitter component coupled to each display device via an HDMI port.

FIG. 7 is an illustrative security camera that pushes video and/or still motion images to display devices using a battery-free transmitter component coupled to each display device via an HDMI port. Display devices 720, 730 includes an HDMI connector 722, 732 that conforms to the HDMI standard. Display devices 720, 730 may be a television, monitor or other type of known display device that incorporates an HDMI compliant connector for receiving video or still motion images. Security camera 710 may be a fixed or a movable camera that captures continuous or still motion images. Security camera incorporates or is coupled to an RF transmitter 712 that broadcasts the continuous or still motion images using known or later developed encoding formats in wireless manner. Dongles 724 and 734 are similar to the dongles described with respect to FIG. 6. Function logic within dongles 724, 734 decodes the continuous or still motion images and stores them in a frame buffer. Encoding logic then produces the HDMI image data. Power conversion logic in dongles 724, 734 is configured to extract power from the HDMI port of displays 720, 730 as described in more detail with respect to FIGS. 1-3 and to provide power to function logic and interface logic within the dongles while the dongle is connected to the display. In this manner, battery-free dongle 724, 734 may provide still or continuous motion image data to be displayed on displays 724, 734 received from security camera 710.

In one illustrative system, security camera 710 may be located at a door of a home or business. One or more display devices such as TVs or computer monitors within the home or business that include HDMI compliant sink connectors may be equipped with a dongle such as dongle 722 and thereby display images in one room or in several rooms of the home or business. Multiple security cameras 710 may be positioned at various locations throughout or around the home or business. Each camera may be identified by a particular code that is transmitted along with the still or continuous motion image data. The dongles may then receive the multiple feeds of image data and generate a composite tiled image or a sequential image, for example, of the various camera feeds.

Another embodiment of the HDMI transmitter component of FIG. 3 may be a battery-less digital video disk (DVD) player. In this embodiment, dongle 300 contains a flash memory as part of function logic 302. The term "flash memory" refers to any type of digital storage circuitry that provides non-volatile storage of data stored therein and that may be loaded with new data in a dynamic manner. Such circuitry may also be referred to as electrically erasable programmable read only memory (EEPROM) or similar terms. Input interface 304 may include an infra-red receiver for receiving commands from a remote control device. Dongle 300 is incased in housing to form a very small, lightweight form factor component, rather like a USB dongle and is configured to plug into the HDMI port of a TV like the other applications. It uses power extracted from the HDMI signals, as described in more detail above, to decode the flash memory and render/playback a movie remote control interface 304 provides transport control, such as play, rewind, fast forward, etc. In other embodiments, remote control interface 304 may be designed to receive commands from a remote control using a radio frequency signals, optic signal, for example, or other suitable methods.

The dongle is re-useable and may have the flash memory updated from either a retail movie outlet that provides movie or entertainment rental services or self-serve kiosk that provides movie or entertainment rental services, for example. This eliminates the need to dispense and receive plastic disks, and also the problems with the disk surface quality.

The dongle (or dongles) typically would be the property of a user, and would be refilled upon purchase of a new movie by inserting the dongle into a download machine at the retail movie outlet or at the kiosk. In some embodiments, the downloaded movie or entertainment package may be set to expire after a defined number of playback times for a short term rental. In another embodiment, the movie may be downloaded without an expiration timer. Function logic 302 within the dongle would keep track of how many times it played back the movie or entertainment package.

In this embodiment, HDMI signal drivers 310-313 are constructed as transceivers, so that they can receive the differential HDMI signals as well as transmit them. While inserted in the download machine, the dongle uses power extracted from the HDMI signals from the download machine, as described in more detail above, to power the flash memory while the flash memory is being loaded with the movie or entertainment package from the download machine. It should be noted that this configuration is a non-standard HDMI configuration, since the receiver normally provides the termination current. In this case, the dongle would be acting as the receiver but the download machine would be providing the termination current. In another embodiment, the download machine may provide power directly to the dongle via the 5V signal line 330. In this case, the dongle may sense the supplied voltage and use that to transition to receiver mode to receive the movie download.

In another embodiment, a DVD dongle may be a dual dongle version with universal serial bus (USB) connector for receiving movie/entertainment downloads from a download machine and an HDMI connector for connection to a display device, such as a television or monitor. This embodiment of the DVD dongle may be updated from a standard personal computer by attaching to a USB port on the computer. While attached to the USB port, the dongle would derive power from the USB power signal to power the flash memory in functional logic 302 while the flash memory is being loaded with the movie or entertainment package from the computer. Of course, with this embodiment, a movie rental store or kiosk could also provide movie or entertainment package downloads via the USB connector.

Figure 8:
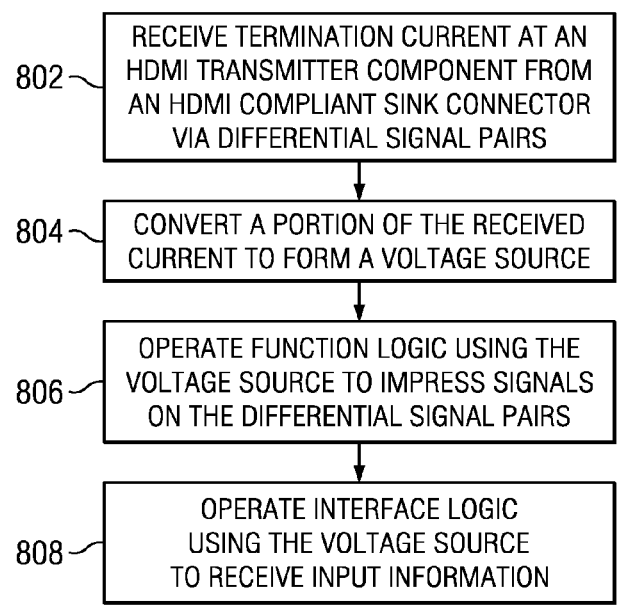
FIG. 8 is a flow chart illustrating powering a transmitter component from an HDMI interface.

FIG. 8 is a flow chart illustrating powering of a transmitter component from an HDMI interface. As described in more detail with respect to FIGS. 1-3, an HDMI transmitter component that is coupled to an HDMI compliant sink connector of a receiver component receives 802 termination current via a plurality of differential HDMI signals from terminators on the receiver component. Power conversion logic on the transmitter component converts 804 a portion of the received current to form a supply voltage Vdd source. Function logic on the transmitter component is operated 806 using the Vdd voltage as a power source, and is configured to transmit video or image data to the receiver component via the plurality of differential signals.

During power conversion 804, a virtual ground reference level Vss is formed relative to a ground reference level Vg of the transmitter component. The Vss voltage and a portion of the received current is used to operate a switching regulator to produce the Vdd voltage referenced to the Vss virtual ground reference level.

During power conversion 804, a portion of the received current may be converted during an initial time period to form a voltage signal to send to the receiver component having a value of approximately five volts referenced to the Vg ground reference.

Receiving 802 termination current may involve setting a termination current value for each of the plurality of differential HDMI signals at a first termination current during a first time period when video data is being transmitted on the plurality of differential signals, and setting the termination current value at a higher second termination current during a second time period when the video data is not being transmitted. In this manner, the Vdd source has a first power capacity during the first time period and a higher second power capacity during the second time period.

Interface logic on the transmitter component is operated 808 using the Vdd voltage to receive input information which is then manipulated by the function logic for transmission to the receiver component via the HDMI signal lines. The interface logic may be for manual user input, such as for a game console, or may be a radio frequency (RF) or infrared (IR) receiver for receiving data transmitted from an image source system in a wireless manner. The image source system may be a digital camera, a security camera, a computer system, a cable or satellite conversion box, or any other type system that may produce video or graphical data for display on the receiver component.

Other Embodiments

While the invention has been described with reference to illustrative embodiments, this description is not intended to be construed in a limiting sense. Various other embodiments of the invention will be apparent to persons skilled in the art upon reference to this description. For example, the wireless coupling between a system or device that provides a video or graphic image to the interface logic of the transmitter component may be done using any type of radio frequency (RF) or infrared (IR) communication standard that is now known or that may be developed later, as long as the interface logic is designed to receive the transmission and the reception and later processing can be done within the power budget afforded by the power conversion logic of the HDMI transmitter component.

One or multiple HDMI transmitter components may be configured to receive a same broadcast of video or image data.

A single HDMI transmitter component may be configured to receive and process one or more than one type of image data broadcast.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

It is therefore contemplated that the appended claims will cover any such modifications of the embodiments as fall within the true scope and spirit of the invention.

What is claimed is:

1. A transmitter component with an HDMI (High-Definition Multimedia Interface) port, comprising:

A. a plurality of pairs of transition minimized differential signaling (TMDS) drivers, configured to drive corresponding pairs of TMDS data and clock signal lines through the HDMI port;
B. tail current circuitry coupled to each of the pairs of TMDS drivers, the tail current circuitry configured to establish a termination current in each of the plurality of TMDS data and clock signal lines and thereby produce a tail current, the tail current circuitry including one transistor for each of the pairs of TMDS drivers for each data and clock signal line, each transistor being coupled between the TMDS drivers and a virtual ground lead, each transistor having a control lead, and the control leads of all of the transistors being connected together and to the control lead of a current mirror transistor;
C. a shunt circuit coupled between the virtual ground lead of the tail current circuitry and a ground reference;
D. power conversion logic coupled in parallel with the shunt circuitry between the virtual ground lead and the ground reference, the power conversion logic configured to convert a portion of the tail current to form a supply voltage Vdd source; and
E. function logic coupled to the power conversion logic and to the plurality of pairs of TMDS drivers, the function logic configured to operate on the Vdd voltage to control the plurality of differential signals.

2. The transmitter component of claim 1, wherein:
the power conversion logic comprises a switching regulator configured to use the Vss voltage and a portion of the tail current to produce the Vdd voltage referenced to the Vss virtual ground reference level.

3. The transmitter component of claim 1, further comprising interface logic coupled to the function logic and to the power conversion logic, wherein the interface logic is configured operate on the Vdd voltage and configured to receive input information, and wherein the function logic is operable to transmit data responsive to the information received on the input interface to the receiving component over the plurality of TMDS data and clock signals.

4. The transmitter component of claim 3 including a game console, wherein the interface logic comprises at least one manual input device, wherein the input information is in the form of manual input indicators for a game type application and the data transmitted to the receiving component is for producing a graphical image for the game on the receiving component.

5. The transmitter component of claim 3 being a dongle configured to connect directly to an HDMI port on a display screen, wherein the interface logic comprises an antenna and receiver configured to receive a video stream transmitted from a host system, and wherein the function logic is configured to transmit the received video stream to the display screen over the plurality of TMDS data and clock signal lines.

6. The transmitter component of claim 5 being a dongle configured to connect directly to an HDMI port on a display screen, wherein the interface logic comprises an antenna and radio frequency receiver configured to receive a picture data transmitted from a host system, and wherein the function logic is configured to transmit the received picture data to the display screen over the plurality of TMDS data and clock signal lines.

7. The transmitter component of claim 3 being a dongle configured to connect directly to an HDMI port on a display screen, wherein the interface logic comprises an antenna and receiver configured to receive a video stream transmitted from a security camera, and wherein the function logic is configured to transmit the received video stream to the display screen over the plurality of TMDS data and clock signal lines.

8. The transmitter component of claim 3 being comprised in a mobile handset, the handset further comprising an HDMI port configured to connect the mobile handset a display screen, wherein the interface logic is configured to receive image date from the mobile handset, and wherein the function logic is configured to transmit the image data to a display screen over the plurality of TMDS data and clock signal lines; and wherein the power conversion logic is configured to provide power to a portion of the mobile handset while the transmitter component of the mobile handset is connected to the display screen.

9. The transmitter component of claim 3, wherein the interface logic comprises a remote control interface configured to receive control commands from a remote control device; and wherein the function logic comprises a non-volatile storage circuit configured to store video information within the transmitter component, such that the transmitter component is operable to transmit the stored video information to the receiving component over the plurality of differential signals to be displayed in response to commands from the remote control device.

10. The transmitter component of claim 9, wherein the function logic is configured to receive video information via the differential HDMI signals for storing in the non-volatile memory.

* * * * *